United States Patent [19]
Crowe et al.

[11] 3,954,636
[45] May 4, 1976

[54] ACIDIZING FLUID FOR STIMULATION OF SUBTERRANEAN FORMATIONS

[75] Inventors: Curtis W. Crowe, Tulsa; Bob D. Baker, Oklahoma City, both of Okla.

[73] Assignee: The Dow Chemical Company, Midland, Mich.

[22] Filed: Aug. 30, 1973

[21] Appl. No.: 393,107

[52] U.S. Cl.............................. 252/8.55 C; 166/307
[51] Int. Cl.²........................................ E21B 43/27
[58] Field of Search................ 252/8.55 C; 166/307, 166/271, 282

[56] References Cited
UNITED STATES PATENTS

| | | | |
|---|---|---|---|
| 2,024,718 | 12/1935 | Chamberlain | 252/8.55 |
| 2,059,459 | 11/1936 | Hund et al. | 166/307 |
| 3,076,762 | 2/1963 | Dill | 252/8.55 |
| 3,396,107 | 8/1968 | Hill | 252/8.55 |
| 3,664,422 | 5/1972 | Bullen | 166/308 X |
| 3,819,520 | 6/1974 | Jones et al. | 252/8.55 |

OTHER PUBLICATIONS

Kingston, Acidizing Handbook, Pub. 1947 by Gulf Publishing Co., Houston, Texas, pp. 45 and 46.

*Primary Examiner*—Herbert B. Guynn
*Attorney, Agent, or Firm*—Bruce M. Kanuch

[57] ABSTRACT

The present invention relates to a composition and method for the acid stimulation of subterranean formations containing a fluid to be recovered. The composition comprises a mixture of an acid which solubilizes at least a portion of the formation, an alcohol in which said acid and carbon dioxide are soluble, and a small proportion of water and carbon dioxide. In practicing the method the composition is prepared as a liquid mixture, introduced into the formation under pressure, allowed to react with the formation and then the pressure is released to recover spent acid.

6 Claims, No Drawings

ACIDIZING FLUID FOR STIMULATION OF SUBTERRANEAN FORMATIONS

BACKGROUND OF THE INVENTION

Liquid carbon dioxide has long been employed in aqueous acidizing solutions to retard the acid reaction rate and aid in recovering the spent acid. However, its effectiveness is limited due to its relatively low solubility in aqueous acid solutions. For example, at 75°C and under 1000 psi pressure carbon dioxide is soluble in water only to the extent of about 0.033 gram per gram of water. It has also been long recognized that an alcohol may be added to an aqueous acidizing solution which is employed to stimulate the production of fluids from subterranean formations. For example, see the teachings of U.S. Pat. Nos. 2,024,718 and 2,059,459.

It has now been discovered that greatly superior acidizing stimulation treatments can be performed by employing a mixture of an acid, an alcohol and carbon dioxide as the acidizing solution.

SUMMARY OF THE INVENTION

The composition of the present invention comprises a mixture of an acidizing acid, a lower molecular weight alcohol, and a small amount of water and carbon dioxide. This mixture is injected into a subterranean formation under sufficient pressure to maintain the carbon dioxide in a liquid or dissolved state at least until a portion of the subterranean formation has been acidized. The composition is allowed to react with the formation and then the pressure released and spent acid, water, alcohol and $CO_2$ are recovered. Upon release of the pressure a portion of the carbon dioxide vaporizes thus providing a gas-lift effect which promotes the return of spent acid from the formation.

DETAILED DESCRIPTION OF THE INVENTION

The composition of the present invention comprises, as per cent by weight, an acid which is capable of dissolving a portion of the subterranean formation from about 2 to about 40 per cent, preferably from about 5 to about 30 per cent; a lower molecular weight alcohol in which such acid is soluble, from about 95 to about 30 per cent, preferably from about 85 to about 40 per cent, and water from about 5 to about 65 per cent, preferably from about 5 to about 40 percent. Liquid carbon dioxide is mixed with the aforedescribed mixture immediately prior to introducing the acidizing composition into the well bore in an amount ranging from about 200 to about 100,000 standard cubic feet (SCF) per 1000 gallons of the acid-alcohol-water mixture. Preferably carbon dioxide is employed in an amount ranging from about 500 to about 50,000 SCF per 1000 gallons of the acid-alcohol-water mixture.

Acids which may be employed in the practice of the present invention includes concentrated and aqueous solutions of, for example, HCl, acetic acid, formic acid, and other standard acidizing acids well-known in the art of stimulating fluid bearing subterranean formations.

Alcohols which may be employed in the practice of the present invention include lower molecular weight straight and branched chain alkyl alcohols containing from about 1 to about 8 carbon atoms. Included by way of example are methyl, ethyl, propyl, butyl and amyl alcohol.

Carbon dioxide is employed in the initial mixture as a liquid. Well-known high pressure containers and trailer transports can be employed for bringing the carbon dioxide to the location of its use. In practicing the invention the acid-alcohol-water mixture is first prepared and then carbon dioxide is pumped directly into the aforedescribed mixture coming from, for example, injection pumpers. The two streams are commingled at the well head through conventional pipe fittings. The mixture is then introduced into the formation to be acidized and the acid allowed to react with the formation to increase its permeability. After the acidizing fluid has been shut in for a suitable period of time, the pressure on the well bore is released and spent acidizing solution is returned from the formation. Upon release of this pressure the carbon dioxide will generally vaporize at the temperature of location of the formation thus providing a gas-lift effect which aids in removing the spent acidizing solution from the formation.

The composition of the present invention is particularly adapted for the acid stimulation of gas producing formations since the composition contains a minimum of detrimental constituents such as water, heavy hydrocarbons and the like.

EXAMPLE 1

A gas producing well was treated in the following manner. 6667 Gallons of a 35 per cent by weight aqueous HCl solution was mixed with 13,333 gallons of methanol. The resulting mixture contained about 15 per cent by weight of HCl. A standard corrosion inhibitor and cupric chloride was added to this mixture. This mixture was pumped into a well simultaneously with carbon dioxide at a total injection rate of about 8 barrels per minute. Approximately 28,600 standard cubic feet of liquid carbon dioxide was employed per 1000 gallons of the alcohol-acid-water solution. Prior to this treatment the well had been acidized with 5500 gallons of aqueous 15 per cent by weight HCl and the open flow potential following the treatment was measured at 200,000 standard cubic feet per day. Following the treatment of the well by the practice of the present invention a calculated open flow potential of 17,500,000 standard cubic feet per day was measured. Other gas wells in the same area which had not been treated according to the practice of the present invention produced at a rate of only 2 to 3 million standard cubic feet per day.

What is claimed is:

1. An acidizing composition for stimulating the flow of fluid from subterranean formation which comprises:
    a. a mixture of from about 2 to about 40 per cent by weight of an acid which is characterized as being able to dissolve at least a portion of the subterranean formation; water from about 5 to about 65 per cent by weight, and a lower alkyl alcohol in which said acid is soluble and in which carbon dioxide is soluble to an extent greater than the solubility of carbon dioxide in water from about 30 to about 95 per cent by weight; and
    b. from about 200 to 100,000 standard cubic feet of liquid carbon dioxide per 1000 gallons of the mixture defined in paragraph (a) above.

2. The composition of claim 1 wherein the acid ranges from about 5 to about 30 per cent by weight, the alcohol ranges from about 85 to 40 per cent by weight, and the water ranges from about 5 to about 40 per cent by weight of the mixture, and the liquid carbon dioxide is present in an amount ranging from about 500 to about 50,000 standard cubic feet per 1000 gallons of the acid-alcohol-water mixture.

3. The composition of claim 1 wherein the alcohol is a branched or straight chain alcohol containing from one to about 8 carbon atoms.

4. A method of stimulating the flow of fluid through a subterranean formation which comprises:

acidizing the subterranean formation while under an elevated pressure with an acidizing composition comprising a mixture of (a) from about 2 to about 40 per cent by weight of an acid which is capable of solubilizing at least a portion of the subterranean formation; from about 5 to about 65 per cent by weight of water, and a lower alkyl alcohol in which said acid is soluble, and in which carbon dioxide is soluble to an extent greater than the solubility of carbon dioxide in water from about 30 to about 95 per cent by weight; and (b) from about 200 to about 100,000 standard cubic feet of liquid carbon per 1000 gallons of the water-alcohol-acid mixture.

5. The method of claim 4 wherein the acid is present in an amount ranging from about 5 to about 30 per cent by weight, the alcohol is present in an amount ranging from about 40 to about 85 per cent by weight, and the water is present in an amount ranging from about 5 to about 40 per cent by weight of the mixture and the liquid carbon dioxide is present in an amount ranging from about 500 to about 50,000 standard cubic feet per 1000 gallons of the acid-alcohol-water mixture.

6. The method of claim 5 wherein the alcohol is branched or straight chain and contains from 1 to about 8 carbon atoms.

* * * * *